(12) United States Patent
Amhamed et al.

(10) Patent No.: US 12,492,000 B2
(45) Date of Patent: Dec. 9, 2025

(54) AIR CURTAIN DEVICE AND AIR CIRCULATION SYSTEM HAVING THE SAME

(71) Applicant: Qatar Foundation for Education, Science and Community Development, Doha (QA)

(72) Inventors: Abdulkarem Ibrahim Amhamed, Doha (QA); Moazzam Ali Khan, Doha (QA); Ahmed Sodiq, Doha (QA)

(73) Assignee: HAMAD BIN KHALIFA UNIVERSITY, Doha (QA)

( * ) Notice: Subject to any disclaimer, the term of this patent is extended or adjusted under 35 U.S.C. 154(b) by 227 days.

(21) Appl. No.: 18/032,066

(22) PCT Filed: Oct. 14, 2021

(86) PCT No.: PCT/QA2021/050021
§ 371 (c)(1),
(2) Date: Apr. 14, 2023

(87) PCT Pub. No.: WO2022/081035
PCT Pub. Date: Apr. 21, 2022

(65) Prior Publication Data
US 2023/0406510 A1    Dec. 21, 2023

Related U.S. Application Data

(60) Provisional application No. 63/091,615, filed on Oct. 14, 2020.

(51) Int. Cl.
*B64D 11/06* (2006.01)

(52) U.S. Cl.
CPC ............... *B64D 11/0626* (2014.12)

(58) Field of Classification Search
CPC ........ B64D 11/0626; B64D 2013/0625; B60N 2/5671; B60N 2/75; B60N 2/803
See application file for complete search history.

(56) References Cited

U.S. PATENT DOCUMENTS

| 2004/0126247 A1* | 7/2004 | Broser ............... B60G 17/052 417/312 |
| 2016/0250956 A1 | 9/2016 | Seiting |

(Continued)

FOREIGN PATENT DOCUMENTS

| CN | 110290951 A * | 9/2019 | ............... B60H 1/03 |
| CN | 110770056 A * | 2/2020 | ......... B60H 1/00878 |

(Continued)

OTHER PUBLICATIONS

International Search Report for related International Application No. PCT/QA2021/050021; action dated Apr. 21, 2022; (2 pages).

(Continued)

*Primary Examiner* — Emmanuel E Duke
(74) *Attorney, Agent, or Firm* — K&L Gates LLP

(57) ABSTRACT

An air curtain device and an air circulation system are provided. The air curtain device includes a main body, an air supply opening configured to receive air, an armrest air jet aperture configured to discharge the received air, and a headrest air jet aperture configured to discharge the received air. The air circulation system includes an air supply device and the air curtain device.

14 Claims, 6 Drawing Sheets

(56) References Cited

U.S. PATENT DOCUMENTS

| | | |
|---|---|---|
| 2017/0127835 A1 | 5/2017 | Jamele et al. |
| 2018/0160816 A1* | 6/2018 | Akaike ................ B60N 2/5671 |
| 2020/0198506 A1 | 6/2020 | Longatte |
| 2020/0253381 A1* | 8/2020 | Dörfler .................... A47C 7/20 |

FOREIGN PATENT DOCUMENTS

| | | | | |
|---|---|---|---|---|
| DE | 102010012143 A1 | * | 9/2011 | ............. B64D 13/06 |
| JP | 2018093921 A | | 6/2018 | |
| KR | 2009113411 A | * | 11/2009 | ......... B60H 1/00028 |
| KR | 20140124449 A | * | 10/2014 | ................ F24F 9/00 |
| WO | WO-2011092448 A1 | * | 8/2011 | ............. E21F 1/003 |
| WO | WO-2020053748 A2 | * | 3/2020 | ............. A62B 3/005 |

OTHER PUBLICATIONS

Written Opinion for related International Application No. PCT/QA2021/050021; action dated Apr. 21, 2022; (5 pages).

\* cited by examiner

AIR CURTAIN DEVICE AND AIR CIRCULATION SYSTEM HAVING THE SAME

CROSS-REFERENCE TO RELATED APPLICATIONS

The present application is a National Stage filing under 35 U.S.C. 371 of International Application No. PCT/QA2021/050021, filed on Oct. 14, 2021 which claims priority to U.S. Provisional Patent Application No. 63/091,615, filed Oct. 14, 2020, the disclosure of which is incorporated into this specification by reference in its entirety.

BACKGROUND

The rapid spread of SARS-CoV-2, the virus that causes COVID-19 sickness, has alerted countries around the world to educate the general public on the importance of personal hygiene, social distancing, the use of face masks and gloves. One of the most effective methods of fighting the spread of highly contagious viruses like SARS-CoV-2 is proven to be social distancing. Recent studies have unveiled the airborne nature of the virus SARS-CoV-2 with strong evidences. Scientists have recently confirmed the possibility of airborne nature of the virus in specific conditions i.e. in confined, crowded and poorly ventilated spaces.

Careful design of HVAC system, strategic location of air supply and extract points and well planned seating layout will help minimize the spread of airborne microbial agents in a centrally air-conditioned space such as the aircraft cabin, commercial and government buildings, inside the metro tubes, in the staterooms on cruise ships, and inside the hospitals.

The Covid-19 pandemic has made a significant impact on the aviation industry. Although airlines have taken substantial steps to ensure the safety of their passengers, the fixed seating configuration in an aircraft makes the social distancing difficult without reducing the number of passengers onboard. Even with reduction of passengers onboard, social distancing is difficult to observe when all passengers breathe in the same conditioned air as the case in most confined spaces. Thus, there are needs to minimize the spread of contaminants from person to person (via cough, sneeze, talk or shout) in enclosed environments and improve the air distribution system and reduce the risk of contracting airborne infectious diseases.

SUMMARY

The present disclosure generally relates to an air curtain device and an air circulation system having the air curtain device.

In light of the present disclosure, and without limiting the scope of the disclosure in any way, in an aspect of the present disclosure, which may be combined with any other aspect listed herein unless specified otherwise, an air curtain device is provided. The air curtain device includes a main body; an air supply opening configured to receive air; an armrest air jet aperture configured to discharge the received air, and a headrest air jet aperture configured to discharge the received air.

In an aspect of the present disclosure, which may be combined with any other aspect listed herein unless specified otherwise, each of the headrest air jet aperture and the armrest air jet aperture has a linear shape.

In an aspect of the present disclosure, which may be combined with any other aspect listed herein unless specified otherwise, the air supply opening is configured to supply air to at least one of the headrest air jet aperture or the armrest air jet aperture.

In an aspect of the present disclosure, which may be combined with any other aspect listed herein unless specified otherwise, the armrest air jet aperture is provided in a direction perpendicular to the headrest air jet aperture.

In an aspect of the present disclosure, which may be combined with any other aspect listed herein unless specified otherwise, the main body includes at least one of nylon fabric, leather, polyester, vinyl or carbon fiber.

In an aspect of the present disclosure, which may be combined with any other aspect listed herein unless specified otherwise, the main body is inflatable by air.

In an aspect of the present disclosure, which may be combined with any other aspect listed herein unless specified otherwise, the main body is configured to be provided on a seat, a desk or table.

In an aspect of the present disclosure, which may be combined with any other aspect listed herein unless specified otherwise, the air curtain device further includes a muffler configured to reduce noise of the air curtain device.

In an aspect of the present disclosure, which may be combined with any other aspect listed herein unless specified otherwise, the air curtain device is configured to provide an air barrier.

In an aspect of the present disclosure, which may be combined with any other aspect listed herein unless specified otherwise, the main body includes an inflatable jacket.

In light of the present disclosure, and without limiting the scope of the disclosure in any way, in an aspect of the present disclosure, which may be combined with any other aspect listed herein unless specified otherwise, an air circulation system is provided. The air circulation system includes an air supply device, and an air curtain device coupled to the air supply device. The air curtain device includes a main body; an air supply opening configured to receive air; an armrest air jet aperture configured to discharge the received air, and a headrest air jet aperture configured to discharge the received air.

Additional features and advantages are described herein, and will be apparent from the following Detailed Description and the figures. It should be understood that the effects described in the present specification are only examples, which do not impose limitations, and additional effects may be further provided.

BRIEF DESCRIPTION OF THE FIGURES

Features and advantages of the present disclosure, including an air curtain device and an air circulation system having the same, described herein may be better understood by reference to the accompanying drawings in which.

Figure 1:
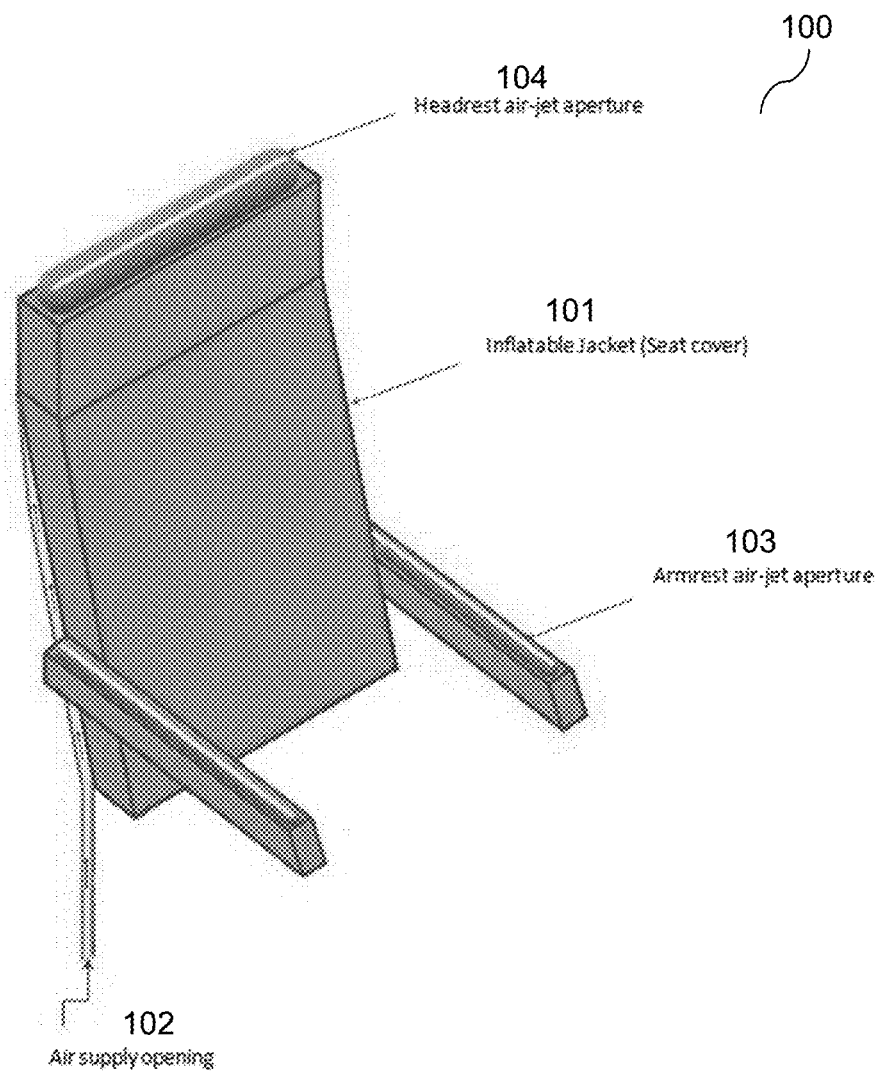
FIG. 1 illustrates an air curtain device according to an embodiment of the present disclosure.

The reader will appreciate the foregoing details, as well as others, upon considering the following detailed description of certain non-limiting embodiments of the present disclosure including the air curtain device and an air circulation system having the same.

DETAILED DESCRIPTION

The present disclosure is generally related to an air curtain device and an air circulation system having the same.

The embodiments are described more fully hereinafter with reference to the accompanying drawings, in which some, but not all embodiments of the present technology are shown. Indeed, the present technology may be embodied in many different forms and should not be construed as limited to the embodiments set forth herein.

Likewise, many modifications and other embodiments of an air curtain device and an air circulation system described herein will come to mind to one of skill in the art to which the invention pertains having the benefit of the teachings presented in the foregoing descriptions and the associated drawings. Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

Throughout the specification and claims, terms may have nuanced meanings suggested or implied in context beyond an explicitly stated meaning. Likewise, the phrase "in an embodiment" as used herein does not necessarily refer to the same embodiment or implementation and the phrase "in another embodiment" as used herein does not necessarily refer to a different embodiment or implementation. It is intended, for example, that claimed subject matter includes combinations of exemplary embodiments or implementations in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" or "at least one" as used herein, depending at least in part upon context, may be used to describe any feature, structure, or characteristic in a singular sense or may be used to describe combinations of features, structures or characteristics in a plural sense. Similarly, terms, such as "a", "an", or "the", again, may be understood to convey a singular usage or to convey a plural usage, depending at least in part upon context. In addition, the term "based on" or "determined by" may be understood as not necessarily intended to convey an exclusive set of factors and may, instead, allow for existence of additional factors not necessarily expressly described, again, depending at least in part on context.

The terminology used herein is for the purpose of describing particular example embodiments only and is not intended to be limiting. The terms "comprise", "comprises", "comprised" or "comprising", "including" or "having" and the like in the present specification and claims are used in an inclusive sense, that is to specify the presence of the stated features but not preclude the presence of additional or further features.

The rapid spread of SARS-CoV-2 (corona virus) has alerted countries around the world to educate the general public on the importance of personal hygiene, social distancing, the use of face masks and gloves. One of the most effective methods of fighting the spread of highly contagious viruses like SARS-CoV-2 is proven to be social distancing.

Careful design of HVAC system, strategic location of air supply and extract points and well planned seating layout will help minimize the spread of airborne microbial agents in a centrally air-conditioned space such as the aircraft cabin, commercial and government buildings, inside the metro tubes, in the staterooms on cruise ships, and inside the hospitals.

For example, the air quality inside the aircraft cabin is dependent on several factors, which include the design of ventilation system, ventilation air flow rate, ambient air quality, the design of the cabin volume, seating layout, the presence and strength of sources of contaminants and the operation and maintenance of cabin ventilation system.

The Covid-19 pandemic has made a significant impact on the aviation industry. Although airlines have also taken substantial steps to ensure the safety of their passengers, the fixed seating configuration in an aircraft makes the social distancing difficult without reducing the number of passengers onboard. Even with reduction of passengers onboard, social distancing is difficult to observe when all passengers breathe in the same conditioned air as the case in most confined spaces. The aviation industry would need a more vigorous and long-term strategy to ensure passengers' health without decreasing passengers densities and associated revenues. In the ongoing COVID-19 crisis, the aviation industry is struggling to regain their customers' trust in taking a flight without worrying about contracting harmful microbial agents inside the aircraft cabin. Thus, it is important to minimize the transport of contaminants from person to person (via cough, sneeze, talk or shout) in enclosed environments and improve the air distribution system and reduce the risk of contracting airborne infectious diseases. There are two possible airborne transmission routes of contracting harmful microbes i.e. through contaminated droplets and aerosols. Surface transmission (fomites) route is easy to deal with because airlines take good care of aircraft cabins cleanliness before and during the flight. Therefore, airborne transmission is the problematic route that needs engineering solution, hence this invention.

This present disclosure is directed to an air curtain device and an air circulation system that minimize the spread of infectious air in a commercial aircraft's cabin and/or in the general indoor environment of any confined space by creating an invisible air barrier/air-curtain around the seats of passengers in aircraft cabins, office workstations and meeting rooms. The air curtain device and the air circulation system will also minimize, for example, the spread of microbial agents produced when passengers/occupants sitting next to each other cough, sneeze, snore, shout, or talk. This will ensure that any respiratory droplets or aerosols are contained within the space of a single passenger/occupant and will not be inhaled by the nearby passengers or occupants until the used air is discharged.

According to an embodiment of the present disclosure, there is provided an air curtain device 100. As illustrated in FIG. 1, the air curtain device 100 includes a main body 101, an air supply opening 102 configured to receive air, an armrest air jet aperture 103 configured to discharge the received air, and a headrest air jet aperture 104 configured to discharge the received air.

The air curtain device 100 is provided around (e.g., at the back and/or top, on the left and right sides) the seat using a crafted and engineered rectangular aperture (slit). The rectangular apertures including an armrest air jet aperture 103 and a headrest air jet aperture 104 are long enough to provide total coverage and thin enough to create an effective air blade that is impervious to droplets and aerosols emanating from cough, sneeze, talk, shout, and the like of individual passengers. The air curtains extend from the armrest level (for the left and right sides) and at the headrest level (for the back side) to the crest (ceiling) of the cabin, where the air is extracted as part of displacement ventilation system, in which airflow begins from the lower level and extracted at the upper level of the cabin. The air curtain device 100 may further include an embedded muffler to reduce noise. The air curtain device 100 may be less pressurized due to the remotely located air supply fan away from the cabin environment.

Figure 2:
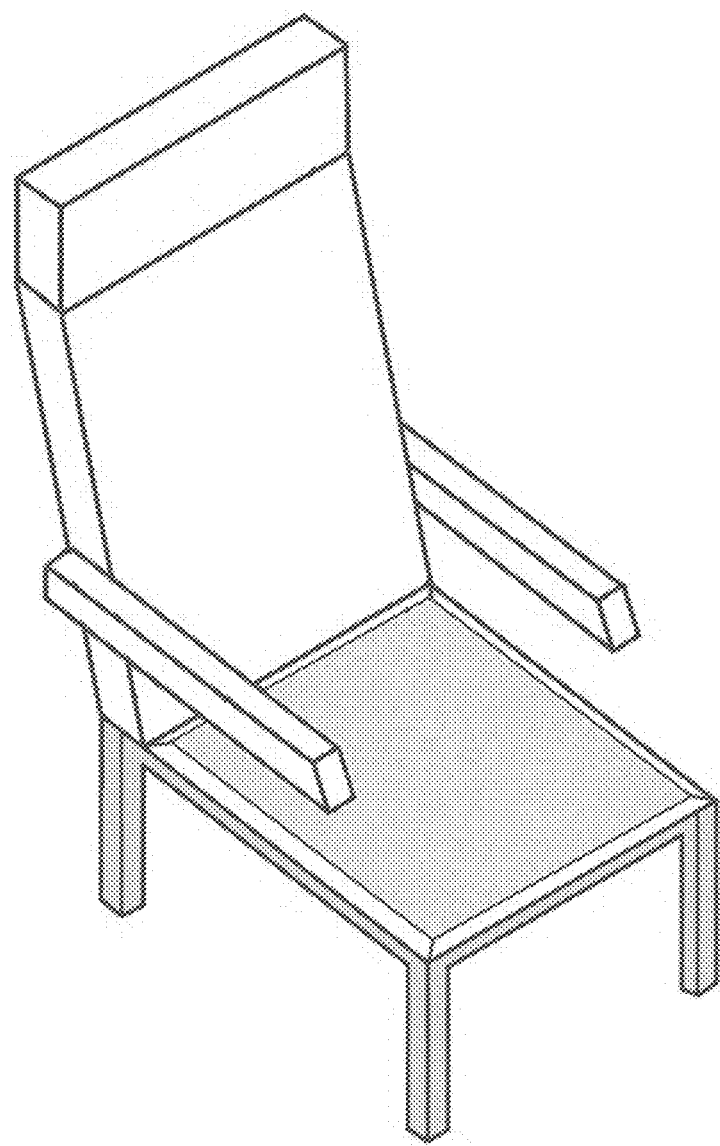
FIG. 2 illustrates a seat according to an embodiment of the present disclosure.
Figure 3:
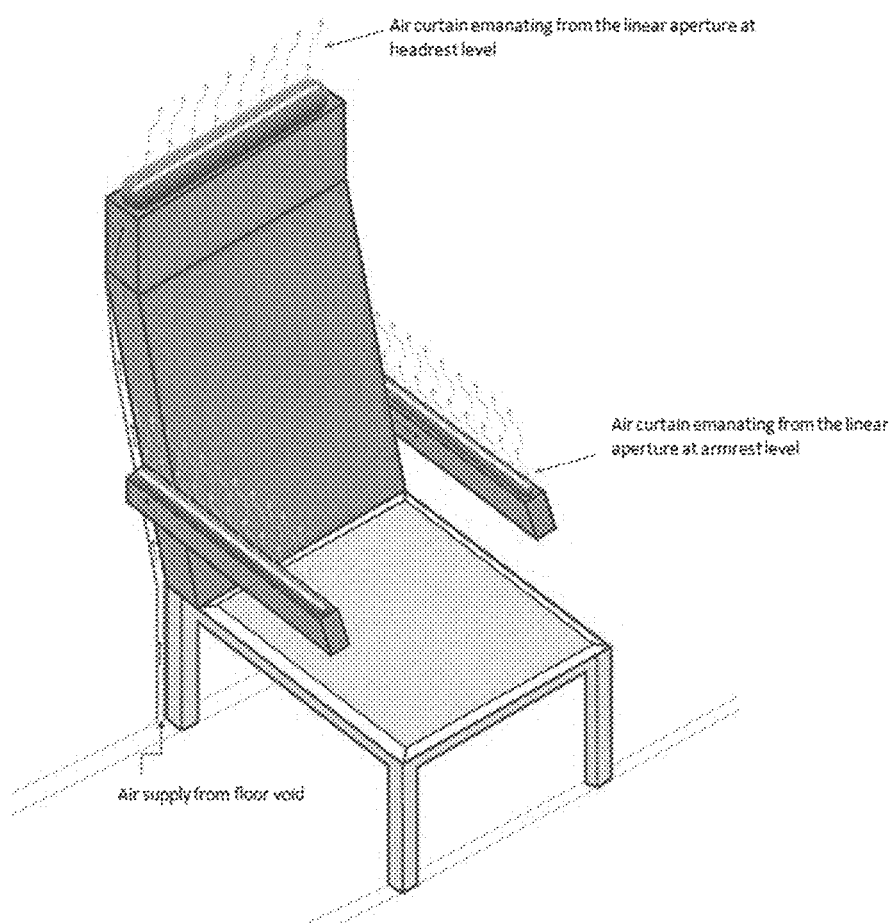
FIG. 3 illustrates an air curtain device according to an embodiment of the present disclosure.

To retrofit the existing aircraft cabin seats as illustrated in FIG. 2, the air curtain device is provided in a specially crafted inflatable jacket according to an embodiment of the present disclosure (See FIG. 1). The air curtain device can be worn around an existing aircraft cabin seat as shown in FIG. 3. Air supply from the cabin floor is passed through an air supply opening 102 in the inflatable jacket to produce continuous air jets to create the air curtain.

In the present disclosure, the air curtain device can, for example, stop the spread of virus and other harmful microbes through generating air curtain barrier. The air curtain device can be used, for example, in indoor space and/or enclosed environments such as the airplane/cruise ship and inside the metro and office buildings.

Some features and advantages of the air curtain device according to an embodiment of the present disclosure are:
(1) Reduction of the spread of COVID-19 and other harmful microbes through the HVAC systems in the enclosed environment;
(2) Green and efficient use of material (use of air instead of physical barrier to prevent cross contamination of harmful microbial agents);
(3) Enhancement of indoor air quality by localizing harmful biological agents for deactivation;
(4) Reduction of cross-contamination of infectious diseases;
(5) Reduction of the concentration of $CO_2$ in indoor atmosphere by localizing exhaled air in order to stop the sickness that is associated with cramped space;
(6) Reducing the spread of harmful microbial agents such as COVID-19
(7) The use of air curtains coupled with displacement ventilation system, UVGI and $CO_2$ filter would increase the confidence of frequent travelers especially with commercial airlines, cruise ships and metros, and will also increase the confidence of workers who are anxious to go back to their respective offices after the lockdown is lifted; and
(8) Rejuvenation of airline industry economy.

Figure 4A:
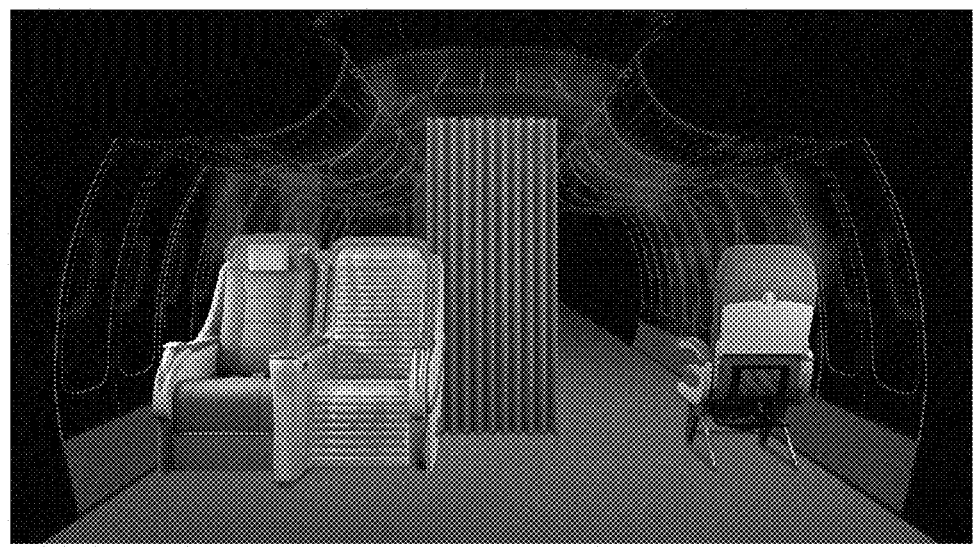
FIG. 4A and FIG. 4B illustrate an air circulation system according to an embodiment of the present disclosure.
Figure 4B:

According to an embodiment of the present disclosure, there is provided an air circulation system as illustrated in FIGS. 4A-4B. The air circulation system includes an air curtain device and an air supply device. By utilizing the existing air supplied to the cabin, create air curtains/blades to provide invisible barrier between passengers/occupants onboard the aircraft, inside staterooms on cruise ships, inside metro tubes and office buildings, the spread of virus and/or harmful microbes through the HVAC systems and cross-contamination of infectious diseases among passengers and occupants especially onboard the airplane/cruise ship and inside the metro and office buildings can be suppressed and stopped. The air circulation system may further include a UV light source according to an embodiment of the present disclosure. The UV light source is provided at the downstream of extracted localized air (the product of personalized air curtain) to summarily deactivate harmful microbial agents (such as COVID-19) therein within the wavelength (220-300 nm) to deactivate viruses, bacteria, molds etc. The air circulation system includes an air filter. The air filter is provided after the UV light source inside the localized extract duct located under the floor of the airplane cabin or metro tube in order to adsorb the $CO_2$ in the used air. The air filter may include a filter material treated either via coating or thermal fusion with nano-materials.

Figure 5:
FIG. 5 illustrates an air curtain device according to an embodiment of the present disclosure.
Figure 6:
FIG. 6 illustrates an air curtain device according to an embodiment of the present disclosure.

According to an embodiment of the present disclosure, an air curtain device and/or an air circulation system may be applied to enclosed environments in the office buildings as illustrated in FIGS. 5-6. For example, the air curtain device and/or the air circulation system can be provided on the tables or office desks. An air supply for creating air curtains may be treated by Ultraviolet Germicidal Irradiation (UVGI) and/or HEPA/ULPA filters. This will ensure the supply of clean and disinfected air for air curtains.

Some features and advantages of an air circulation system according to an embodiment of the present disclosure are:
(1) Displacement ventilation system follows ideal gas law, in which warm air is lighter than cold air and would always prefer to go up in a relatively cold environment. As a result, the air circulation system is better than the conventional one, which forces warm air to the feet of the passengers against natural convection;
(2) The air circulation system provides invisible air barrier as a protection between passengers seated next to each other against harmful microbes produced through coughing, sneezing or talking;
(3) The use of air barrier coupled with UVGI would deactivate microbial agents in the aircraft/metro instead of using face masks for self-protection and to prevent spread of microbes;
(4) The air circulation system enhances the indoor air quality;
(5) The air circulation system uses eco-friendly and non-toxic adsorbents;
(6) The filter of the air circulation system is positioned indoors and would utilize the low temperature (18-22° C.) for adsorption of $CO_2$ from the used air;
(7) The air circulation system including the air curtain provides total protection against the spread of microbial agents unlike the existing air curtains applied from the top of air cabin, which give minimal protection; and
(8) The air curtain application makes use of the cabin air without additional air supply.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An air curtain device, comprising:
a main body,
an air supply opening configured to receive air,
an armrest air jet aperture configured to discharge the received air, and a headrest air jet aperture configured to discharge the received air, wherein the armrest air jet aperture and the headrest air jet aperture are configured to discharge the received air in a direction which provides an air barrier around a seat.

2. The air curtain device of claim 1, wherein each of the headrest air jet aperture and the armrest air jet aperture has a linear shape.

3. The air curtain device of claim 1, wherein the air supply opening is configured to supply air to at least one of the headrest air jet aperture or the armrest air jet aperture.

4. The air curtain device of claim 1, wherein the armrest is provided in a direction perpendicular to the headrest.

5. The air curtain device of claim 1, wherein the main body includes at least one of nylon fabric, leather, polyester, vinyl or carbon fiber.

6. The air curtain device of claim 1, wherein the main body is inflatable by air.

7. The air curtain device of claim 1, wherein the main body is configured to be provided on a seat, a desk or table.

8. The air curtain device of claim 1, further comprises a muffler configured to reduce noise of the air curtain device.

9. The air curtain device of claim 1, the main body includes an inflatable jacket.

10. An air circulation system, comprising:
an air supply device including an air pump, and
an air curtain device coupled to the air supply device,
wherein the air curtain device includes:
  a main body,
  an air supply opening configured to receive air,
  an armrest air jet aperture configured to discharge the received air, and
  a headrest air jet aperture configured to discharge the received air,
  wherein the armrest air jet aperture and the headrest air jet aperture are configured to discharge the received air in a direction which provides an air barrier around a seat.

11. The air curtain system of claim 10, wherein each of the headrest air jet aperture and the armrest air jet aperture has a linear shape.

12. The air curtain system of claim 10, wherein the armrest is provided in a direction perpendicular to the headrest.

13. The air curtain system of claim 10, wherein the main body includes at least one of nylon fabric, leather, polyester, vinyl or carbon fiber.

14. The air curtain system of claim 10, wherein the main body is inflatable by air.

* * * * *